US007676245B2

(12) United States Patent
Laiho et al.

(10) Patent No.: US 7,676,245 B2
(45) Date of Patent: Mar. 9, 2010

(54) RECEIVER MODULE COMPRISING A WIDEBAND ANTENNA

(75) Inventors: Kimmo Laiho, Turku (FI); Maurj Mäkivuoti, Turku (FI); Ilkka A. Tähtinen, Turku (FI)

(73) Assignee: Nokia Corporation, Espoo (FI)

( * ) Notice: Subject to any disclaimer, the term of this patent is extended or adjusted under 35 U.S.C. 154(b) by 620 days.

(21) Appl. No.: 10/949,814

(22) Filed: Sep. 27, 2004

(65) Prior Publication Data

US 2005/0186931 A1    Aug. 25, 2005

(30) Foreign Application Priority Data

Sep. 30, 2003   (GB)   ................. 0322890.5

(51) Int. Cl.
    H04M 1/00    (2006.01)
    H04B 1/38    (2006.01)
(52) U.S. Cl. ................. 455/556.1; 455/557; 455/575.7; 455/63.1; 455/90.3
(58) Field of Classification Search ................. 455/41.1, 455/575.1–575.7, 63.1, 567, 412.2, 90.3, 455/274, 3.04, 556.1, 280, 553.1, 426.1, 455/421, 556.2, 557, 269, 272
    See application file for complete search history.

(56) References Cited

U.S. PATENT DOCUMENTS

| 5,649,306 | A  | * | 7/1997  | Vannatta et al. | .......... | 455/575.7 |
| 5,929,813 | A  | * | 7/1999  | Eggleston       | ............ | 343/700 MS |
| 6,297,778 | B1 | * | 10/2001 | Phillips et al. | .............. | 343/702 |
| 6,326,924 | B1 | * | 12/2001 | Muramoto et al. | .......... | 343/702 |
| 6,330,438 | B1 | * | 12/2001 | McClelland et al. | ........ | 455/421 |
| 6,407,702 | B1 | * | 6/2002  | Bergman et al.  | ............ | 342/364 |
| 6,804,500 | B2 | * | 10/2004 | Yamaguchi       | ............... | 455/127.1 |
| 6,895,248 | B1 | * | 5/2005  | Akyol et al.    | .............. | 455/452.1 |
| 6,983,140 | B2 | * | 1/2006  | Higuchi         | ....................... | 455/421 |
| 7,092,695 | B1 | * | 8/2006  | Boling et al.   | ............. | 455/404.1 |
| 2002/0008788 | A1 |   | 1/2002 | Talmola et al.  |           |           |
| 2002/0010763 | A1 | * | 1/2002 | Salo et al.     | .................... | 709/220 |
| 2002/0045468 | A1 | * | 4/2002 | Jalili           | .......................... | 455/567 |
| 2003/0181226 | A1 | * | 9/2003 | Kawata et al.   | .............. | 455/572 |
| 2003/0228892 | A1 | * | 12/2003 | Maalismaa et al. | ........ | 455/575.7 |
| 2004/0157578 | A1 | * | 8/2004 | Auranen         | ................... | 455/278.1 |

FOREIGN PATENT DOCUMENTS

JP          2002135200 A    *   5/2002
WO          WO-03105458         12/2003

OTHER PUBLICATIONS

Yu et al, WO 03/091924, Published Nov. 6, 2003.*
Search Report issued by UK Patent Office, dated Feb. 23, 2004, for corresponding priority application GB 0322890.5.

* cited by examiner

Primary Examiner—Quochien B Vuong
(74) Attorney, Agent, or Firm—Banner & Witcoff, Ltd.

(57) ABSTRACT

A receiver module 11 comprises a loop antenna 14 for receiving signals from a digital broadcast network 3. The receiver module 11 may be an integral component of, or attached to, a mobile terminal 1 that comprises a cellular transceiver 8. For example, the receiver module 11 may be incorporated in a battery pack and inserted into a battery compartment of the mobile terminal 1, so that the receiver module 11 and mobile terminal 1 are powered by battery 13. The loop antenna 14 is substantially resistant to electric fields produced by the transceiver 8 and other sources, and may be arranged within the receiver module 11. Where an external loop antenna 41 is provided instead of, or in addition to, loop antenna 14, the receiver module 11 may be arranged to monitor the quality of signals received from the digital broadcast network 3 and alert a user to deploy the external antenna 41 if the signal quality is low or decreasing.

27 Claims, 6 Drawing Sheets

RECEIVER MODULE COMPRISING A WIDEBAND ANTENNA

The invention relates to a receiver for receiving digital broadcast transmissions at a mobile terminal. The receiver is particularly suitable for use in a mobile terminal that comprises a transceiver for enabling telephone communication.

Proposed services for mobile terminals, such as news, entertainment or business services, may require the transmission of a considerable amount of content to one or more receiving devices. The content may include audio, video, multimedia, graphic or other data, such as music files or film clips. Currently, limited multimedia services are provided on-demand in mobile telephones using Universal Mobile Telecommunication System (UMTS)/Third Generation (3G) networks. However, the power supply to a mobile terminal is typically limited, for example, to the capacity a rechargeable battery. Therefore, further developments in such services will require a highly efficient data delivery mechanism.

Internet Protocol Datacast (IPDC) is a broadcast system for transmitting data over a wireless connection, in which terrestrial and satellite digital video broadcast (DVB-T, DVB-S) networks may be used. A further transmission standard, DVB-H, has been proposed, specifically for DVB transmission to handheld or mobile terminals, taking into account their restricted power and memory capacities.

However, if a mobile terminal is to offer both DVB reception capability and cellular telecommunications, it must include multiple antennas. The small size of, for example, a mobile telephone handset means that the antennas must be located in close proximity to one another, resulting in a significant risk of interference between them. This risk would be particularly marked in a mobile terminal arranged to receive telecommunications over a Global System for Mobile communications (GSM) 900 network, as the frequency of the GSM signals would be close to those picked up by a wideband antenna for DVB signals, at, say, 470-860 MHz.

According to the present invention, a receiver module for digital broadcast reception comprises an antenna, an amplifier for amplifying signals received by the antenna, a demodulator and means for connecting the receiver module to a mobile terminal.

The receiver module may be configured to receive a battery and be attachable to the mobile terminal. The battery may supply power to both the mobile terminal and receiver module simultaneously.

Preferably, the antenna is a loop antenna. A loop antenna responds to the magnetic field component of an electromagnetic wave. Therefore, the risk of interference between the loop antenna and a second antenna within the mobile terminal may be relatively low. For example, where the mobile terminal is a mobile telephone, this allows a second antenna for telephone communication to be located in close proximity to the loop antenna without the performance of either antenna being significantly affected. This allows considerable freedom in the design of the antennas and, in particular, allows a digital broadcast receiver to be located within a mobile terminal that comprises a conventional antenna for use in telephone communication. Furthermore, the loop antenna is also highly resistant to electrical interference from external sources and its radiation pattern is not influenced significantly by proximity to the user.

Shielding for the antenna may be provided, for example, in the form of a cover or shield of suitable conductive material, in order to shield the antenna from electric fields produced by components of the mobile terminal.

The receiver module may further comprise a matching circuit for matching the impedances of the antenna and amplifier.

The receiver module may be configured to receive DVB-T transmissions and may further be arranged to receive time-sliced IPDC transmissions using a method of selective data reception.

The invention further provides a mobile terminal comprising the receiver module, a battery pack comprising the receiver module, a cover for a portion of the mobile terminal comprising the receiver module and a mobile terminal comprising such a battery pack or cover.

Embodiments of the invention will now be described byway of example with reference to the accompanying drawings, in which.

Figure 1:
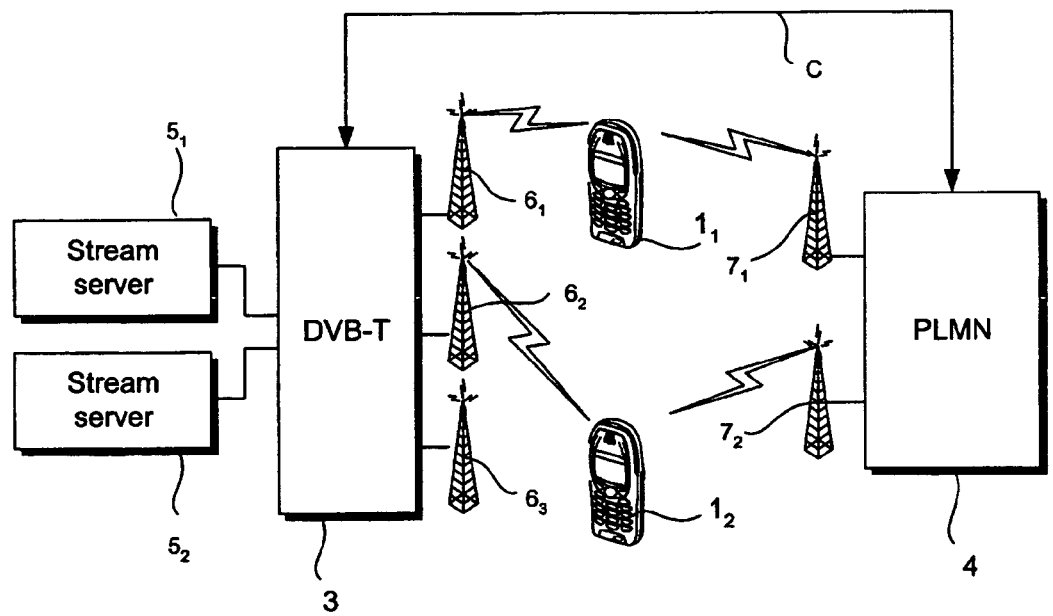
FIG. 1 is a schematic block diagram of a mobile communications system including a DVB-T cellular network and a mobile telecommunications network.

FIG. 1 illustrates schematically a communication system in which mobile user equipment in the form of mobile terminals $1_1$, $1_2$ are configured to receive transmissions from a DVB-T network 3 and also to enable telephone communication through a public land mobile network (PLMN) 4. In this particular embodiment, the DVB-T network 3 transmits signals using at frequencies between 470 and 860 MHz, while the PLMN 4 may be any suitable 2G, 2.5G or 3G network, for example, a GSM 900 network.

The DVB-T network 3 provides an IP datacast (IPDC) service for transmitting content to the terminals $1_1$, $1_2$, such as audiovisual content or multimedia clips, images, games, data files, other software etc. Content is obtained from data stream servers $5_1$, $5_2$ in TCP/IP format as Internet protocol (IP) datagrams. Two such servers $5_1$, $5_2$ are shown by way of example although in practice there may be many more.

The DVB-T network 3 is cellular and antennae $6_1$, $6_2$ and $6_3$ serve individual cells of the network at geographically spaced sites. The datagrams obtained from the servers $5_1$, $5_2$ can be multicast through an IP network, not shown, comprising interconnected routers, to individual transmission sites associated with the antennae $6_1$, $6_2$, $6_3$. It will be understood that the cells associated with each of the antennae $6_1$, $6_2$, $6_3$ are typically of the order of 30 km in radius and so the network of routers may be configured over a wide area. Any suitable IP network can be used, for example, a broadband corporate network or the Internet.

At each of the transmission sites, content received from the IP network is fed to an IP encapsulator which performs a multi-protocol encapsulation process. The resulting encapsulated data packets can be included within, for example, a Motion Pictures Expert Group (MPEG-2) transport stream (TS) packet used for DVB-T transmissions. For further details, reference is directed to ETSI EN 301 192 V1.3.1 (2003-01) "Digital Video Broadcasting (DVB) DVB specification for data broadcasting" Section 7.

The transport stream is broadcast to terminals $1_1$, $1_2$ within the relevant DVB-T cell as follows. The transport stream is fed to a modulator, which may comprise a quadrature amplitude modulator, that provides a number of logical channels for reception by terminals $1_1$, $1_2$ within the cell. The output of the modulator is fed to a transmitter connected to antenna $6_1$. Thus, content from the servers $5_1$, $5_2$ can be routed to the transmission sites individually and transmitted as IP data over the DVB-T network 3 to the terminals $1_1$, $1_2$. It will be understood that the DVB-T transmission from each of the antennas $6_1$, $6_2$, $6_3$ is unidirectional to the terminals $1_1$, $1_2$.

The PLMN 4 comprises a suitable mobile telephone network, such as a 2G, 2.5G or 3G network, and antennae $7_1$ and $7_2$ that serve individual cells of the PLMN 4. A communication channel C may be provided between the DVB-T network 3 and the PLMN 4 to allow bi-directional communication between the networks, for example, for the interchange of service information.

Figure 2:
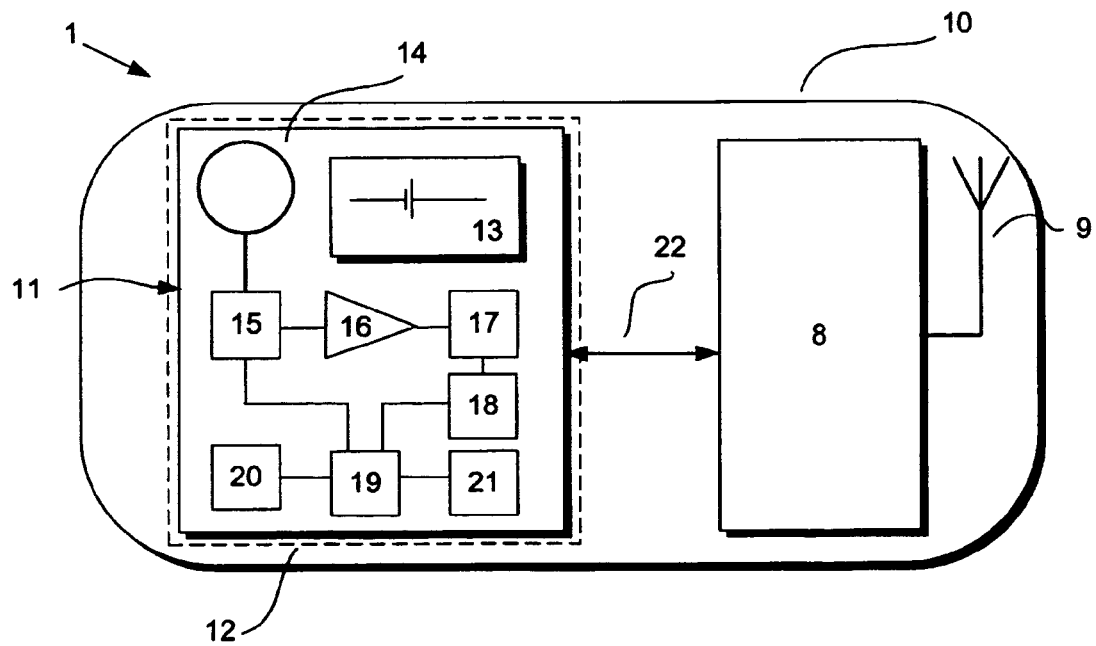
FIG. 2 is a block diagram of a mobile terminal comprising a receiver module according to a first embodiment of the invention.

An example mobile terminal 1 is shown in FIG. 2. The terminal 1 is configured so that it may be handheld and comprises a transceiver 8 and a dipole antenna 9, or other suitable antenna, for enabling telephone communication via the PLMN network 4. The terminal 1 includes other conventional features, including a microphone, a speaker, a codec, a user interface, such as a display and keypad, and so on. These features are omitted from FIG. 2 for the sake of clarity. The circuitry for processing signals that are to be transmitted or have been received from the PLMN network 4 is contained in a main body 10 of the terminal 1.

In order to enable the reception of data broadcast over the DVB-T network 3, a receiver module 11 is provided. In this embodiment, the receiver module 11 is inserted into a battery slot 12 in the terminal housing 10. The receiver module 11 retains a rechargeable battery 13 for supplying power to both the transceiver 8 and receiver module 11, as well as the other components of the terminal 1, such as the user interface, speaker etc.

The receiver module 11 also includes a second antenna 14, matching circuitry 15, an amplifier 16, a Radio Frequency (RF) downconverter 17, a demodulator 18, a processor 19, memory 20 and storage facility 21. The processor 19 controls the other components of the receiver module 11 on the basis of software stored in the memory 20, in order to process TP data packets, received from an IIPDC transmission, and/or video signals picked up by the second antenna 14. If required, the processor 19 may also be arranged to perform an error correction procedure on the received data packets.

The receiver module 11 further comprises timing circuits (not shown), such as a real-time clock and/or system clock, and interfaces (not shown) for interfacing various parts of the receiver module 11 to other components of the terminal 1.

The matching circuitry 15 matches the impedance of the second antenna 14 to that of the amplifier 16. The signals received through the second antenna 14 are amplified by amplifier 16 and downconverted to an intermediate or baseband frequency by downconverter 17 before being passed to the demodulator 18. The demodulated signals are stored in storage facility 21 for subsequent presentation to a user of the terminal 1.

The receiver module 11 is connected to the transceiver 8 through a connection 22, so that content received from the DVB-T network 3 can be presented through the user interface of the terminal 1, i.e. a display and/or audio output means as appropriate. The receiver module 11 may also be controlled, for example, switched on and off, by a further processor within the main body of the terminal 1 via the connection 22.

Figure 3:
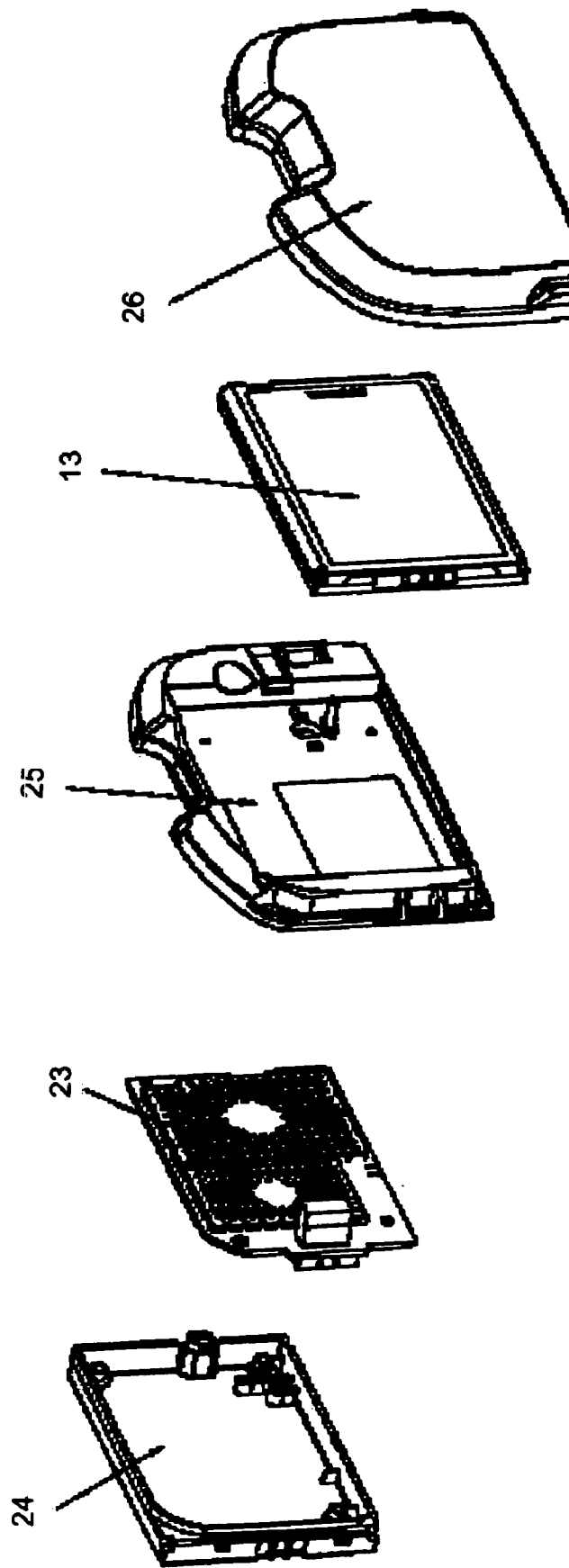
FIG. 3 is an exploded view of the receiver-module of the mobile terminal of FIG. 2, together with a battery and battery cover.

FIG. 3 is an exploded view of the receiver module 11 of the mobile terminal of FIG. 2. The receiver module 11 comprises a printed wiring board (PWB) 23, on which components of the receiver module, such as the matching circuitry 15, amplifier 16, downconverter 17, demodulator 18, processor 19, memory 20 and storage facility 21 are arranged. The PWB 23 is enclosed in a casing formed by two sections 24, 25. Section 25 houses the second antenna 14, which is hidden from view in FIG. 3, and includes a recess for receiving the rechargeable battery 13. A removable cover 26, which forms part of an external housing of the terminal 1, is arranged to cover the battery 13 and receiver module 11.

Figure 4:
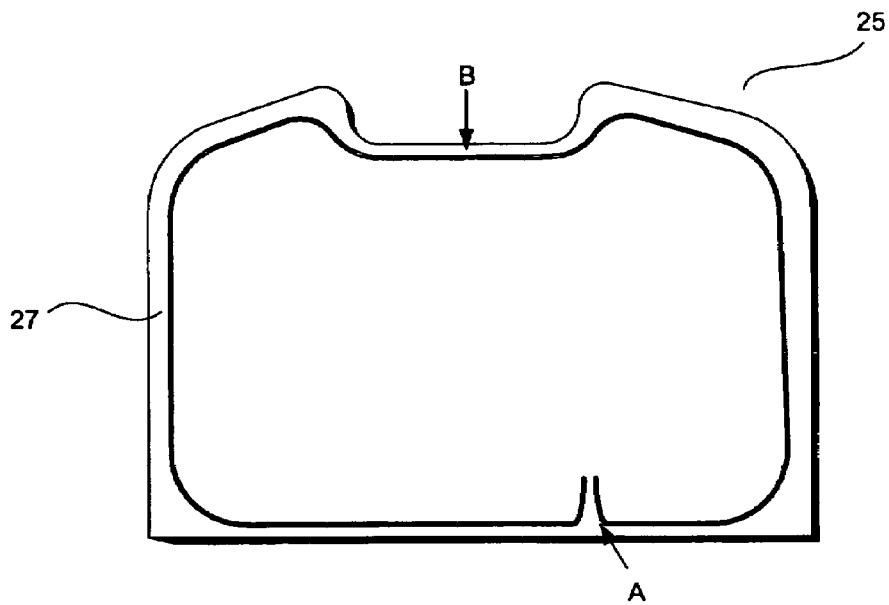
FIG. 4 depicts an antenna within the receiver module of FIGS. 2 and 3.

Referring to FIG. 4, in this particular embodiment, the second antenna 14 is a single loop antenna comprising a silver plated copper wire 27, inserted into a slot in the periphery of casing section 25. As the loop antenna 14 responds only to changes in a magnetic field component of an electromagnetic wave, the risk of interference with dipole antenna 9 is minimised. Therefore, the radiation patterns and performance of the dipole antenna 9 and loop antenna 14 are not significantly affected by their proximity to one another, the response of both antennas 9, 14 may be reasonably stable and mistuning and traps effects are avoided.

The loop antenna 14 is grounded independently of the other components of the terminal 1 and, in this embodiment, is substantially symmetrical in shape. The loop antenna 14, matching circuitry 15 and, optionally, amplifier 16 are isolated from the other components of the terminal 1 and receiver module 11. This may be achieved by passing each wire connecting the loop antenna 14 or matching circuitry 15 to a ground plane through a ferrite bead, or a bead of another conductive material, that has a high impedance at the frequencies to be received by the loop antenna 14. If required, the amplifier 16 may also be isolated in this manner.

However, in any case, the loop antenna 14 is located several millimetres from both the dipole antenna 9 and the ground of the mobile terminal 1. In addition, as the performance of the loop antenna 14 is highly resistant to the proximity of the user, the loop of wire 27 can be placed close to the periphery of the terminal 1, to avoid shadowing of incoming signals by other components of the terminal 1.

The placement of the loop antenna 14 shown in FIG. 4, extending around the periphery of the receiver module 11, also allows the radius of the single loop to be maximised with respect to the dimensions of the receiver module 11 and, therefore, terminal 1. The use of a loop antenna 14 with a large radius assists in an adequate frequency response across the DVB waveband. It would be possible to further increase the radius of the loop antenna 14 using a configuration with multiple loops and/or folds. However, the provision of multiple loops would increase the capacitance, inductance and resistance of the loop antenna 14, and may result in difficulty matching the impedances of the loop antenna 14 and amplifier 16.

In order to reduce interference from other components of the terminal 1, such as the transceiver 8, and external sources, such ambient electrical noise, noise emitted from electrical devices or unwanted signals from nearby transmitters, the loop antenna 14 may be shielded by way of a covering of suitable conductive material, for example, copper or silver. Where such a covering (not shown) is provided, it encloses, but is galvanically isolated from, the loop antenna 14.

In such an embodiment, the coating or cover may be grounded at one end of the loop antenna 14, for example, at point A in FIG. 4, or at its maximum point, in the middle of the loop, labelled point B. Incidentally, even without such a coating or cover, the loop antenna 14 is highly resistant to effects caused by the proximity of the user.

Instead of being formed from a wire 27, the loop antenna 14 may be formed from a coaxial cable. In this case, the inner core of the cable is arranged to act as the antenna and is shielded by the outer layer. The outer layer is grounded, preferably at one of the two positions A, B discussed in relation to the first embodiment, shown in FIG. 4. Alternatively, foil or tape, such as a copper foil, may be used to form the loop antenna 14.

In the embodiment of FIGS. 3 and 4, the loop antenna 14 is located in a slot within section 25 of the casing of the receiver module 11. The loop antenna 14, whether formed from wire 27, coaxial cable, foil or tape may be moulded into, or embedded within the casing section 25.

Figure 5:
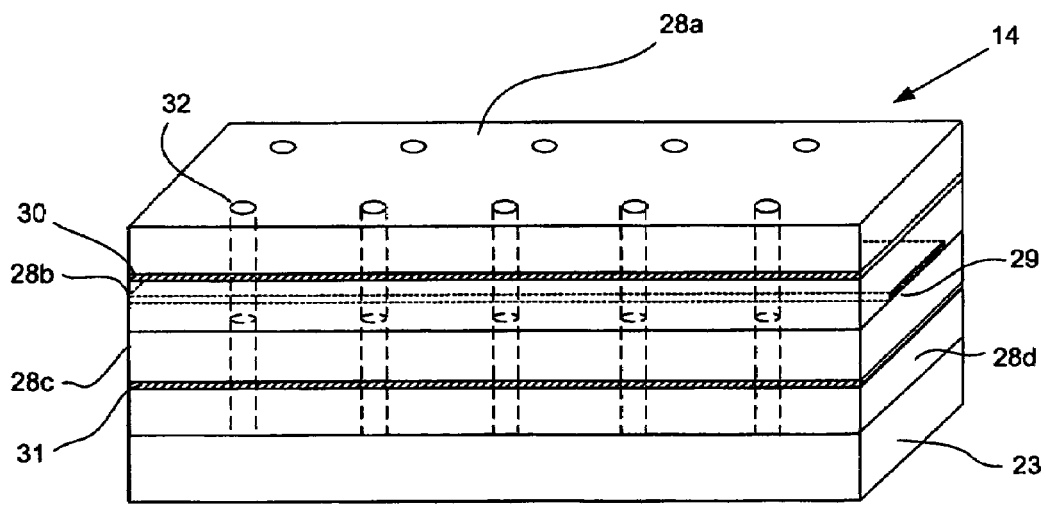
FIG. 5 is a cross-section of a PWB within the receiver module comprising an alternative antenna.

Another option is to form the loop antenna 14 on the PWB 23. In such an embodiment, a coating may be applied to the PWB 23 in multiple layers 28a to 28d as shown in FIG. 5. The loop antenna 14 is formed using a copper foil 29 embedded between two layers of the coating 28b, 28c. Two layers 30, 31 of shielding, such as a micro-strip, are provided, which are connected to a ground of the loop antenna 14. Circular vias, e.g. 32, are provided in order to prevent a potential difference between layers 30, 31. In FIG. 5, only a small number of the vias 32 are shown extending through the coating layers 28a to 28d for reasons of clarity, however each via extends in this manner and is plated in order to provide an electrical connection between the layers 30, 31. Thus, the vias 32 and layers 30, 31 form a cage surrounding the foil 29.

Although the arrangement of FIG. 5 includes four layers of coating, it is possible to provide this type of antenna using three layers 28a to 28c of coating or, if required, more than four layers 28a to 28d.

The loop antenna 14 may be mounted on the PWB 23 that carries other components of the receiver module 11, such as the matching circuitry 15 etc., as shown in FIG. 5. However, in another embodiment of the invention, the loop antenna 14 may be provided on a separate PWB.

Figure 6:
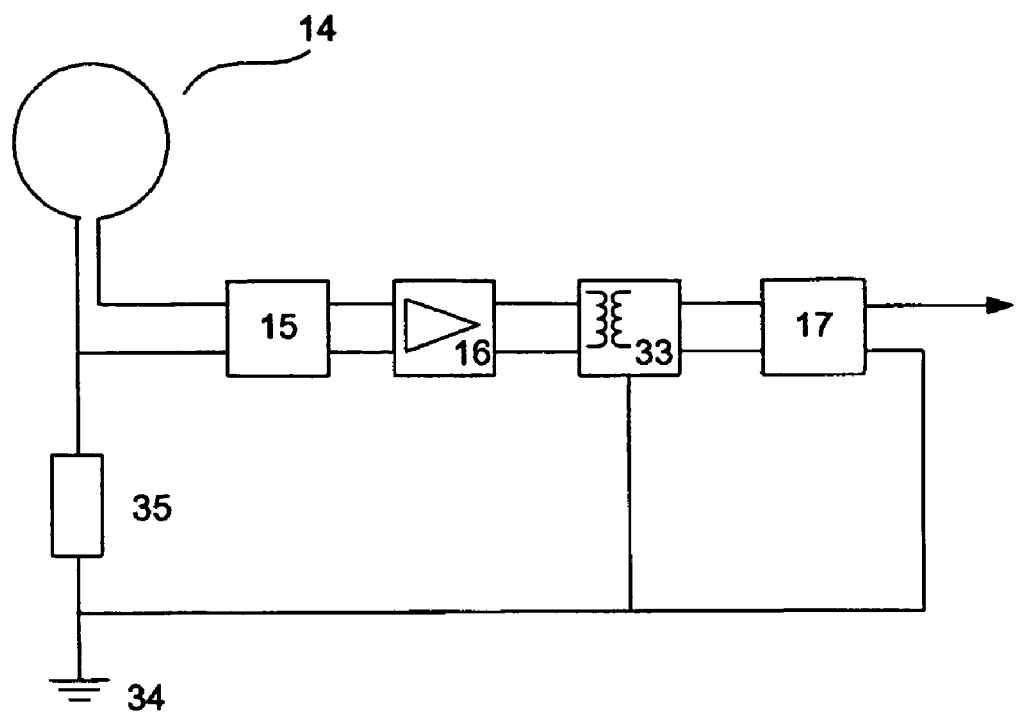
FIG. 6 is a block diagram showing part of the receiver module circuitry in the receiver module of FIGS. 2 and 3.
Figure 7:
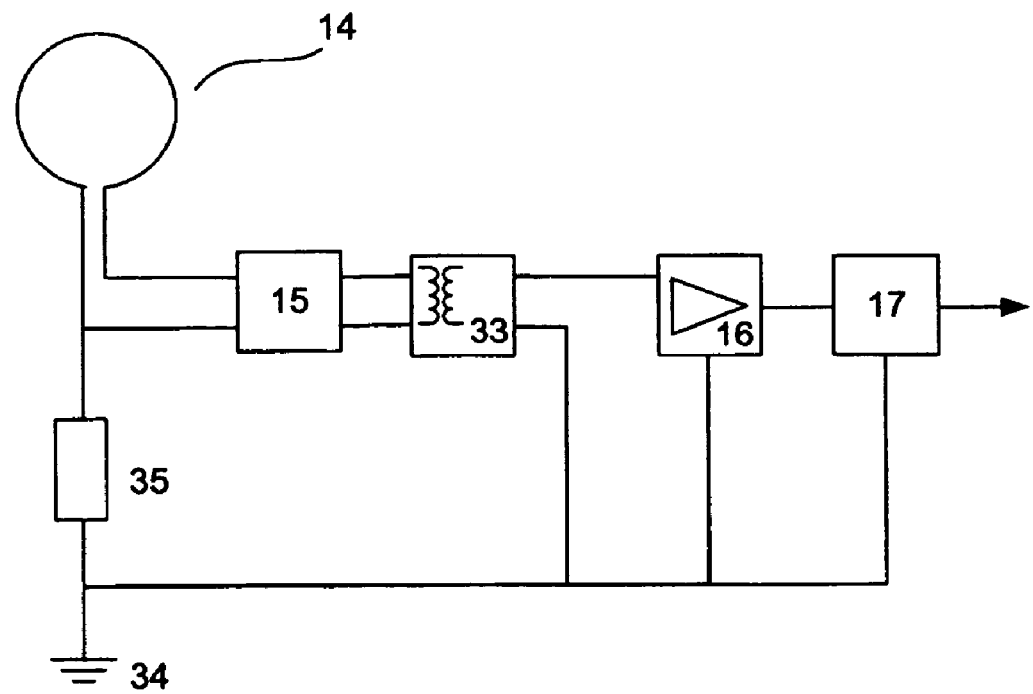
FIG. 7 is a block diagram showing part of an alternative circuitry arrangement suitable for use in the receiver module of FIGS. 2 and 3.

The circuitry components of the receiver module 11 will now be described. FIGS. 6 and 7 are simplified schematic diagrams of exemplary arrangements of the matching circuitry 15, amplifier 16 and downconverter 17 within the receiver module 11. A symmetrical transformer 33 is provided in order to isolate antenna ground 34 from the ground of the mobile terminal 1. The received signals are unavoidably attenuated by the transformer 33. This attenuation is compensated by amplifying the signals using amplifier 16. In the embodiments of FIGS. 6 and 7, the amplifier 16 is a low noise radio frequency amplifier (LNA). The transformer 33 may be positioned between the amplifier 16 and the downconverter 17, as shown in FIG. 6, or between the matching circuitry 15 and amplifier 16, as shown in FIG. 7. In both cases, the antenna 14, the matching circuitry 15 and, in the arrangement of FIG. 6, the amplifier 16 are isolated from the ground 34 of the terminal 1, e.g. by a ferrite 35.

Figure 8:
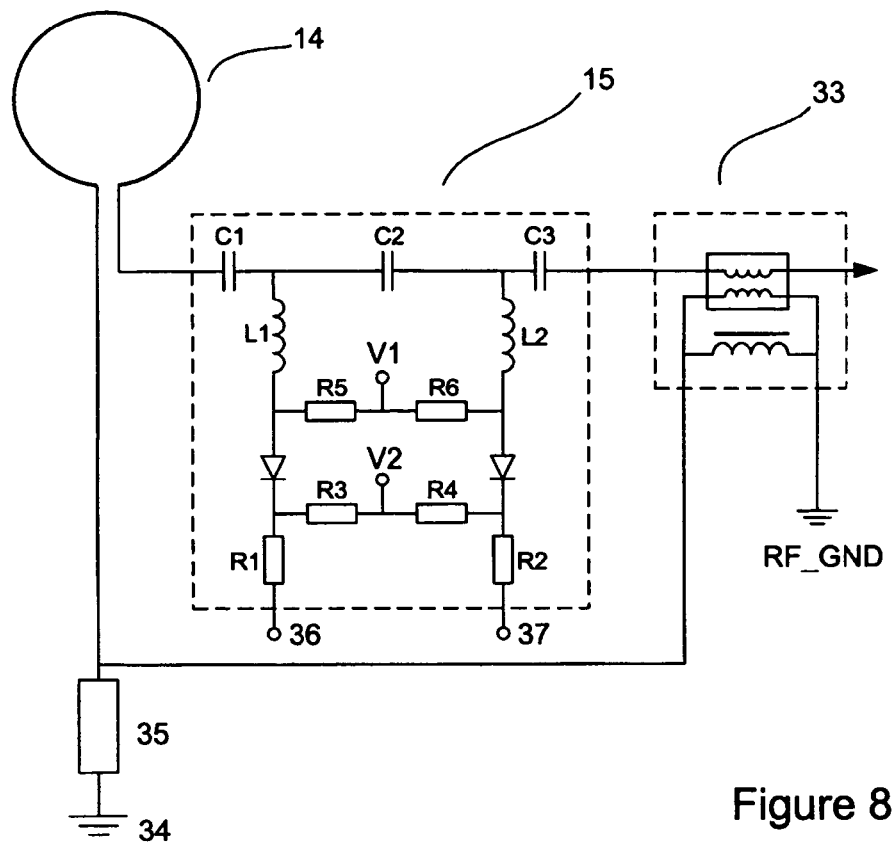
FIG. 8 shows matching circuitry for use in the receiver module circuitry of FIG. 6 or FIG. 7.
Figure 9:
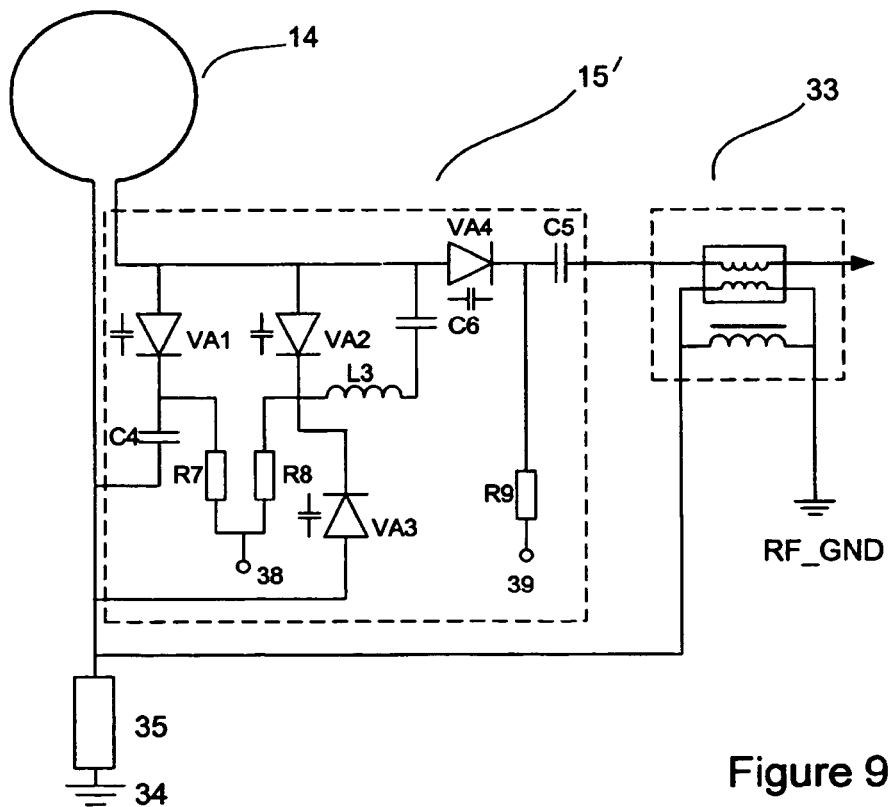
FIG. 9 shows alternative matching circuitry for use in the receiver module circuitry of FIG. 6 or FIG. 7.

FIGS. 8 and 9 show matching circuitry 15, 15' together with a transformer 33 for use in the arrangement of FIG. 7. However, the matching circuitry 15, 15' may instead be used in the arrangement of FIG. 6.

The matching circuitry 15 may be switchable, as shown in FIG. 8. The matching circuitry 15 is used for tuning the loop antenna 14 to a selected frequency or frequency band, thereby tuning the receiver module 11 to a desired receiving channel. In this particular example, the matching circuitry 15 comprises a chain of resistors R1 to R6, inductors L1, L2 and capacitors C1, C2 and C3. Fixed biasing voltages are applied at points V1, V2. In one embodiment of the invention, the fixed voltages V1 and V2 are equal, although such a correspondence is not essential.

The matching circuit 15 can be tuned to one of four predetermined wavebands, in a manner well known per se. A waveband is selected by the appropriate application of control signals to ports 36, 37. In this particular embodiment of the invention, the control signals are voltages representing logical levels. The matching circuit 15 is tuned according to a logical input indicated by the application of control signals to ports 36, 37, and does not depend on the actual biasing voltages used. For example, the logical level '0' may be indicated by 0 volt (V) and the logical level '1' by a control signal of, say, 3 or 5 volts (V), depending on the overall supply levels and other design considerations. If control signals corresponding to logical level '0' are applied to ports 36, 37, corresponding to a logical input of "00", a first waveband is selected. Other wavebands may be selected by applying a control signal corresponding to logical level '1' only to port 37, i.e., logical input "01", or only to port 36 ("10") or by applying control signals corresponding to logical level '1' to both ports 36, 37 ("11").

FIG. 9 depicts an arrangement comprising an example of alternative matching circuitry 15'. The matching circuitry 15' comprises varactors VA1-VA4, resistors R7-R9, capacitors C4, C5, C6, input ports 38, 39 and an inductor L3.

The matching circuitry 15' is tuned to a desired frequency using either a tuning voltage or, in a software based system, output from a digital-to-analogue converter, in a well known manner. Tuning voltages are applied to ports 38 and 39. The tuning voltages, which may or may not be equal, can be varied within a fixed range, for example, 0 to 12V, in accordance with the desired frequency. The capacitance of the matching circuitry 15' is determined by, and tracks any variations in, the tuning voltages and thereby the matching circuitry is tuned to the desired frequency. For example, the application of higher tuning voltages results in the reception of incoming signals at a higher frequency.

In a variation on the matching circuitry arrangement of FIG. 9, the output of a digital-to-analogue converter may be applied to ports 38, 39 in order to select the received frequency.

The data broadcast over the DVB-T network 3 may be "time-sliced". In such an arrangement, data packets relating to a particular service or content are grouped together into a series of "bursts" that take up most or all of the available bandwidth and having a relatively short duration. Each burst in the series carries a significant amount of interrelated data. The bursts are transmitted intermittently over the DVB-T network 3 and may be interspersed with one or more unrelated bursts of data. Each burst in a particular series preferably, but not necessarily, has a predetermined duration and is separated from the preceding and succeeding burst in the series by a predetermined time interval.

The receiver module 11 may be configured to operate a method of selective data reception for time-sliced data broadcast over the DVB-T network 3. If the receiver module 11 is to receive a particular service, it may be controlled by the processor 19 so that, while the bursts in the relevant series are being received, the receiver module 11 operates normally. However, in the intervals between the bursts, the data transmitted over the DVB-T network 3 may pertain to one or more further services that are of no interest or use. During these intervals, the receiver module 11 is switched off or, alternatively, switched into a low power operational mode in order to conserve power. The use of selective data reception to receive time-sliced transmissions may result in a reduction in the time for which the receiver module 11 must operate in order to receive a given amount of data. As a large proportion of the power consumption of the terminal 1 is due to the demands of the receiver module 11 when receiving data transmissions, this reception method allows more efficient use of the available power, prolonging the life of the battery 13 before recharging is required.

In order to perform selective data reception, information regarding the start times and lengths of the bursts in the series must be available to the processor 19 of the receiver module 11. For example, schedules for the time-sliced transmissions may be stored in the terminal 1. The schedules, which may include transmission frequencies, may be received in an IPDC transmission, e.g. in the form of an electronic service guide or service information.

FIGS. 10a, 10b, 11a and 11b depict further examples of mobile terminals 40, 45 comprising receiver modules 11 according to second and third embodiments of the invention respectively. In these embodiments, a receiver module comprising a loop antenna 14, as in the first embodiment, is separate from, and connectable to, a mobile terminal. In these particular examples, a receiver module is housed in a battery compartment of a mobile terminal and draws power from a battery arranged to power the other components of the mobile terminal, as described in relation to the first embodiment.

Figure 10A:
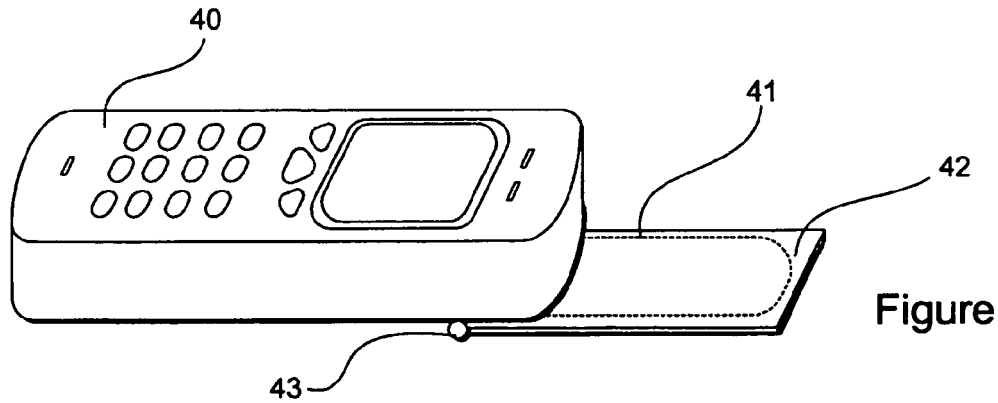
FIGS. 10a and 10b depict a mobile terminal comprising a receiver module according to a second embodiment of the invention in perspective view and side view respectively.
Figure 10B:
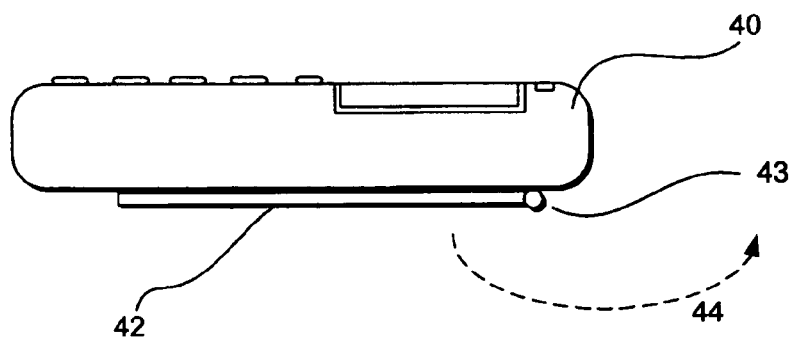

In the mobile terminal 40 shown in FIGS. 10a and 10b, a receiver module (not shown) according to a second embodiment of the invention differs from the receiver module 11 of the first embodiment, in being arranged to receive signals from the DVB network 3 through a second loop antenna 41, in addition to a loop antenna (not shown) located within the receiver module.

The second loop antenna 41 is external to the receiver module and is located on, moulded into, or housed within, a supporting flap 42. The second loop antenna 41 may be connected to the receiver module directly or through a connecting cable.

As the second loop antenna 41 is mounted externally of the receiver module casing (not shown), the dimensions of the loop is not limited by the dimensions of the receiver module. Therefore, this arrangement permits the provision and use of a loop antenna 41 with a larger radius and/or area. In addition, the user may position the loop antenna 41 so that its physical separation from the transceiver of the mobile terminal 40 is increased, further improving its reception capability.

The supporting flap 42 is mounted on the exterior of the mobile terminal 40 via a hinged connection 43. FIG. 10a shows the mobile terminal 40 when the second loop antenna 41 is positioned for receiving digital broadcast data. FIG. 10b shows the mobile terminal 40 when the second loop antenna 41 is not in use, in which case the supporting flap 42 comprising the second loop antenna 41 is "folded away" by being positioned against a rear side of the mobile terminal 40.

The second loop antenna 41 may be deployed by rotating the supporting flap 42 about the hinged connection 43 in the direction of arrow 44. Reception through the first loop antenna, located within the receiver module 11, is then disabled using a switch. This may be performed automatically, for example, using a switch activated when the user deploys or folds away the second loop antenna 41, or by providing a switch for manual operation by the user.

A processor 19 within the receiver module may be configured to monitor the quality of an incoming digital broadcast signal. The signal quality may be evaluated by comparing one or more suitable parameters with a predetermined reference value. Examples of suitable parameters include signal strength, bit error rate (BER), packet error rate (PER) and an output from an automatic gain control system associated with the amplifier 16, an RF stage or an intermediate frequency stage within the receiver module. If it is determined that the received signal quality is inadequate and/or that the received signal quality is deteriorating, the processor 19 may display an alert message on the user interface of the mobile terminal 40. If the incoming digital broadcast signals are being received through the first loop antenna 14, the alert message may prompt the user to deploy the second loop antenna 41 and, if necessary, to operate a switch disabling the first loop antenna. However, if the second loop antenna 41 is already in use, the alert message may indicate that the user should try to reposition the second loop antenna 41, in order to improve the received signal quality.

Figure 11A:
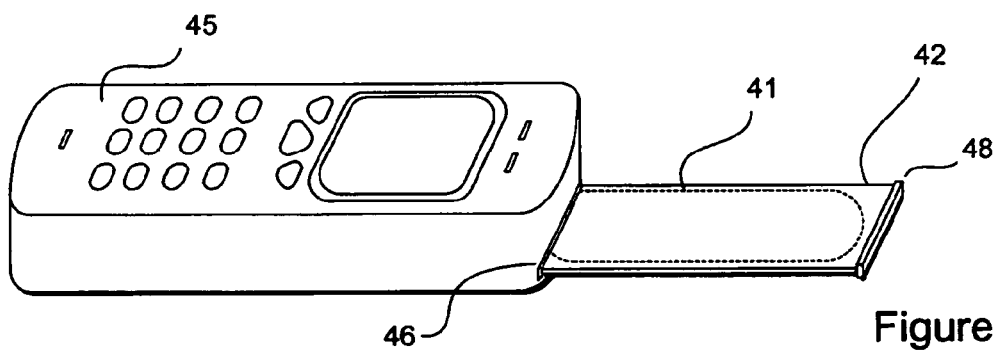
FIGS. 11a and 11b depict a mobile terminal comprising a receiver module according to a third embodiment of the invention in perspective view and side view respectively.
Figure 11B:
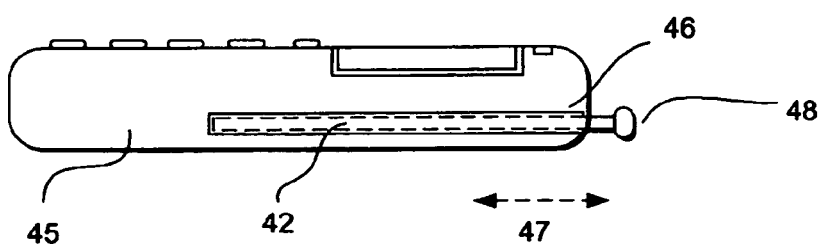

In FIGS. 11a and 11b, a mobile terminal 45 comprises a second loop antenna 41 that is located on, moulded into, or housed within, a supporting flap 42, as in the second embodiment. However, instead of using a hinged connection, the second loop antenna 41 is mounted so that it may be deployed by a sliding action, so that it may be drawn out of, or pushed into, a slot 46 provided within the housing of the mobile terminal 45, by applying a force in either of the directions indicated by arrow 47. The flap 42 housing the second loop antenna 41 may include a grip 48 to assist a user when deploying or storing the second loop antenna 41.

While FIGS. 11a and 11b show a mobile terminal 45 with a slot 46 for receiving the second loop antenna 41 that is located within the casing of the mobile terminal 45, the second loop antenna 41 may instead be arranged to slide on the exterior of the housing of the mobile terminal 45 by providing suitable retaining means, such as tracks arranged to receive the edges of the flap 42. Alternatively, the flap 42 may be provided with projecting formations configured to co-operate with the tracks.

The receiver module may comprise switching means and/or a signal quality monitoring arrangement as described above in relation to the second embodiment of the invention.

The configuration and operation of the receiver modules of the second and third embodiments of the invention, such as the internal circuitry, signal processing, configuration of the antenna and operational modes, are as described in relation to the first embodiment.

The embodiments described above are examples showing how the invention may be implemented. For example, it is not essential for the first and/or second loop antennas 14, 41 to be provided in the form of a single loop, as shown in FIGS. 4, 10a, 10b, 11a and 11b. One or both loop antennas 14, 41 may be in the form of a folded loop.

External antennas 41, such as those in the second and third embodiments of the invention, may be provided instead of an antenna 14 located within the housing of the mobile terminal 1 or receiver module 11. Alternatively, the external antenna 41 may be provided on a cover that may be attached to a portion of the mobile terminal to form part of the mobile terminal housing 10. Such a cover may be detachable.

A signal quality monitoring arrangement, as described in relation to the second embodiment, may be implemented in the mobile terminal 1 of the first embodiment, in order to prompt the user to deploy an external antenna or, where no such external antenna 41 is provided, to attach an external antenna to the receiver module 11 or mobile terminal 1.

The second and third embodiments have been described in relation to a receiver module 11 that is separate from, and connectable to, the mobile terminal 1. However, in other embodiments of the invention, a receiver module that is integral to the mobile terminal 1 may be arranged to receive signals through an external loop antenna 41. For example, a receiver module permanently housed within a mobile terminal may be arranged to receive digital broadcast signals through a loop antenna 14 that is hinged or slideably mounted on the mobile terminal.

Furthermore, a receiver module may be provided within, or mounted on, a cover that may be attached to cover a portion of a mobile terminal, to form part of an exterior housing of the mobile terminal. The cover may be configured so that it is detachable from the mobile terminal. A second loop antenna 41 may also be mounted on, or within, the cover. For example, a second loop antenna may be hingeably connected to the cover, in a similar manner to that shown in FIGS. 10*a* and 10*b*, or mounted within a cover comprising a slot, similar to the arrangement depicted in FIGS. 11*a* and 11*b*. A receiver module attached to such a cover may, if required, be arranged to be received in a battery compartment of a mobile terminal when the cover is attached to the mobile terminal.

The mobile terminal 1 may take the form of a mobile telephone handset, or another form of receiving device such as a Personal Digital Assistant (PDA). While the receiver module 11 is suitable for use in equipment configured to communicate over a telephone network, it may also be used in a device without such capability.

In addition, the receiver module 11 may be a detachable module, as shown in FIGS. 1 to 3, incorporated within a detachable battery pack further comprising the rechargeable battery 13 or integrated within the terminal 1 or other receiving device.

It is not essential to provide a separate battery cover 26 as the receiver module 11 may be arranged so that part of its casing 24, 25 or the battery 13 itself forms part of the external housing of the terminal 1 or other receiving device. This type of arrangement may be used in a variation on the second and third embodiments, shown in FIGS. 10*a*, 10*b*, 11*a* and 11*b*, so that the loop antenna 14 is supported on a flap that is mounted directly onto the receiver module 11.

The above described embodiments are arranged to receive signals broadcast over a DVB-T network However, the receiver module 11 may be arranged to receive signals from a DVB-H network as well as, or instead of, DVB-T network 3. The invention is not limited to use with DVB-T or DVB-H networks and can be implemented for receiving transmissions over one or more other digital broadcast networks, including DVB-S, Advanced Television Systems Committee (ATSC), Integrated Services Digital Broadcasting (ISDB) and Digital Audio Broadcast (DAB) networks instead of, or as well as, DVB-T and/or DVB-H broadcast signals.

The invention claimed is:

1. An apparatus comprising:
   a first antenna configured to respond to a magnetic field component of an electromagnetic wave;
   an amplifier configured to amplify signals received by the first antenna;
   a demodulator configured to demodulate signals received by the first antenna;
   a connector configured to connect the apparatus to a mobile terminal having a second antenna, the mobile terminal and the apparatus configured to simultaneously receive signals on different wavebands through the first antenna and the second antenna; and
   a cover configured for attachment to an exterior portion of the mobile terminal.

2. The apparatus according to claim 1, wherein the apparatus is attachable to the mobile terminal and connectable to a battery, so that said battery can supply power to both the mobile terminal and the apparatus simultaneously.

3. The apparatus according to claim 2, wherein said battery is received in a recess provided in the apparatus.

4. The apparatus according to claim 1, wherein the first antenna is arranged to be substantially resistant to an electric field component in an electromagnetic wave within a predetermined waveband.

5. The apparatus according to claim 4, wherein the first antenna is a first loop antenna.

6. The apparatus according to claim 5, wherein the first antenna is arranged within a casing of the apparatus.

7. The apparatus according to claim 6, arranged so that each portion of the first loop antenna is located at a position close to a periphery of the apparatus.

8. The apparatus according to claim 6, wherein the first loop antenna is housed in a slot in a casing of the apparatus.

9. The apparatus according to claim 6, wherein the first antenna is mounted on a printed circuit board within the apparatus.

10. The apparatus according to claim 6, arranged to receive signals through the first antenna, the first antenna comprising a second loop antenna extending outside a housing of the mobile terminal.

11. The apparatus according to claim 10, arranged to compare the quality of incoming digital broadcast signals with a predetermined value.

12. The apparatus according to claim 11, arranged to respond to a determination that the signal quality is below the predetermined value by generating an alert message for display on a user interface of the mobile terminal only when the signal quality at the mobile terminal is below the predetermined value.

13. The apparatus according to claim 12, arranged so that, if said incoming digital broadcast signals are received through the first loop antenna, the alert message comprises an indication that the second loop antenna should be deployed.

14. The apparatus according to claim 12, arranged so that, if said incoming digital broadcast signals are received through the second loop antenna, the alert message comprises an indication that the second loop antenna should be repositioned.

15. The apparatus of claim 10, further comprising a switch configured to select the second loop antenna and to disable the first loop antenna.

16. The apparatus of claim 10, further comprising a supporting flap that contains the second loop antenna and that hinges on a housing of the mobile terminal.

17. The apparatus according to claim 5, wherein the first loop antenna is mounted externally of a housing of the mobile terminal.

18. The apparatus according to claim 1, integrated within the mobile terminal.

19. The apparatus according to claim 1, configured for use in the mobile terminal that comprises a telephone transceiver.

20. The apparatus according to claim 19, comprising means for electrically decoupling the first antenna and telephone transceiver.

21. The apparatus according to claim 1, comprising a matching circuit configured to match the impedance of the first antenna to that of the amplifier and to track a desired reception frequency for one of a plurality of predefined wavebands from a control signal to the matching circuit.

22. The apparatus according to claim 1, configured to receive signals broadcast over a network selected from the group consisting of a DVB-T network and a DVB-H network.

23. The apparatus according to claim 21, further configured to selectively receive bursts of time-sliced data and to switch into a low power operational mode during a time interval between the bursts.

24. The apparatus of claim 1, being incorporated within a battery pack.

25. The apparatus of claim 24, wherein the mobile terminal includes the battery pack.

26. The apparatus of claim 1, wherein the apparatus is included in the mobile terminal.

27. The apparatus of claim 1, wherein the mobile terminal includes the cover.

\* \* \* \* \*

UNITED STATES PATENT AND TRADEMARK OFFICE
CERTIFICATE OF CORRECTION

PATENT NO. : 7,676,245 B2 Page 1 of 1
APPLICATION NO. : 10/949814
DATED : March 9, 2010
INVENTOR(S) : Kimmo Laiho et al.

It is certified that error appears in the above-identified patent and that said Letters Patent is hereby corrected as shown below:

In Column 11, Claim 23, Line 12:
Please replace "21" with --22--.

Signed and Sealed this

Tenth Day of August, 2010

David J. Kappos
*Director of the United States Patent and Trademark Office*